US00RE47821E

(19) United States
(12) Reissued Patent
Barenbrug et al.

(10) Patent Number: US RE47,821 E
(45) Date of Reissued Patent: Jan. 21, 2020

(54) RIM COVER

(71) Applicant: Royalty Bugaboo GmbH, Zug (CH)

(72) Inventors: Max Barenbrug, Amsterdam (NL); Marco Willem Hendricus Nieuwenhuizen, Bussum (NL); Joris Jeroen Schubert, Uitgeest (NL)

(73) Assignee: Royalty Bugaboo GmbH, Zug (CH)

(21) Appl. No.: 29/662,749

(22) Filed: Sep. 7, 2018

Related U.S. Patent Documents

Reissue of:
(64) Patent No.: Des. 785,511
Issued: May 2, 2017
Appl. No.: 29/521,190
Filed: Mar. 20, 2015

(30) Foreign Application Priority Data

Nov. 19, 2014 (EM) ..... 002581058

(51) LOC (12) Cl. ..... 12-12
(52) U.S. Cl.
USPC ..... D12/133
(58) Field of Classification Search
USPC ..... D12/204, 208, 209, 211, 129, 130, 131, D12/132, 133; D3/318
CPC .... B62B 7/00; B62B 7/01; B62B 7/02; B62B 7/03; B62B 7/04; B62B 9/00; B62B 5/00; B60B 9/26
See application file for complete search history.

(56) References Cited

U.S. PATENT DOCUMENTS

D326,838 S * 6/1992 Julien ..... D12/211
D359,939 S * 7/1995 Chien ..... D12/133
D388,749 S * 1/1998 Kiser ..... D12/211
D389,101 S * 1/1998 Julien ..... D12/209
(Continued)

*Primary Examiner* — Philip S Hyder
(74) *Attorney, Agent, or Firm* — Fross Zelnick Lehrman & Zissu, P.C.; Charles T. J. Weigell, Esq.

(57) CLAIM

The ornamental design for a rim cover, as shown and described.

DESCRIPTION

[FIG. 1 is a front perspective view of a rim cover with wheel showing the new design;]
[FIG. 2 is a front view thereof;]
[FIG. 3 is a rear view thereof;]
[FIG. 4 is a right side view thereof;]
[FIG. 5 is a left side view thereof;]
[FIG. 6 is a top view thereof;]
[FIG. 7 is a bottom view thereof; and]
FIG. 8 is a front perspective view of a rim cover without wheel showing the new design;
FIG. 9 is a front view thereof;
FIG. 10 is a rear view thereof;
FIG. 11 is a right side view thereof;
FIG. 12 is a left side view thereof;
FIG. 13 is a top view thereof; and,
FIG. 14 is a bottom view thereof.
The broken line showing of the hub [in FIGS. 3 and 10] *and spokes* reflects unclaimed subject matter.

1 Claim, 9 Drawing Sheets

Matter enclosed in heavy brackets [ ] appears in the original patent but forms no part of this reissue; matter printed in italics indicates the additions made by reissue.

(Amended)

(56) References Cited

U.S. PATENT DOCUMENTS

| | | | | | |
|---|---|---|---|---|---|
| D398,894 | S | * | 9/1998 | Kelley | D12/208 |
| D414,453 | S | * | 9/1999 | Tsai | D12/133 |
| D421,941 | S | * | 3/2000 | Cheng | D12/209 |
| D421,946 | S | * | 3/2000 | Drone | D12/190 |
| D428,593 | S | * | 7/2000 | Julien | D12/209 |
| D432,067 | S | * | 10/2000 | Tsai | D12/209 |
| D435,974 | S | | 1/2001 | Hsu et al. | |
| D436,908 | S | * | 1/2001 | Yeh | D12/209 |
| D437,281 | S | * | 2/2001 | Chen | D12/211 |
| D439,875 | S | * | 4/2001 | Zemlicka | D12/208 |
| D445,389 | S | * | 7/2001 | Stach | D12/209 |
| D453,132 | S | * | 1/2002 | Chen | D12/209 |
| D455,693 | S | * | 4/2002 | Sato | D12/209 |
| D473,379 | S | * | 4/2003 | Moon | D3/318 |
| D477,261 | S | * | 7/2003 | Lin | D12/133 |
| D501,813 | S | * | 2/2005 | Ikeda | D12/208 |
| D508,005 | S | * | 8/2005 | Ikeda | D12/208 |
| D511,488 | S | * | 11/2005 | Hou | D12/209 |
| D524,196 | S | * | 7/2006 | You | D12/133 |
| D583,300 | S | * | 12/2008 | Rancati | D12/133 |
| D592,042 | S | * | 5/2009 | Brodbeck | D8/375 |
| D602,405 | S | * | 10/2009 | Skafdrup | D12/128 |
| D616,339 | S | * | 5/2010 | Kho | D12/129 |
| D667,349 | S | * | 9/2012 | Jurkiewicz | D12/133 |
| D673,091 | S | * | 12/2012 | Li | D12/208 |
| 8,967,647 | B1 | * | 3/2015 | Bastien | B62B 9/18 280/124.127 |
| D739,794 | S | * | 9/2015 | Juskowich | D12/133 |
| D739,795 | S | * | 9/2015 | Juskowich | D12/133 |
| D757,892 | S | * | 5/2016 | Walker | D23/213 |
| 2013/0069334 | A1 | * | 3/2013 | Li | B60G 3/02 280/124.128 |

* cited by examiner

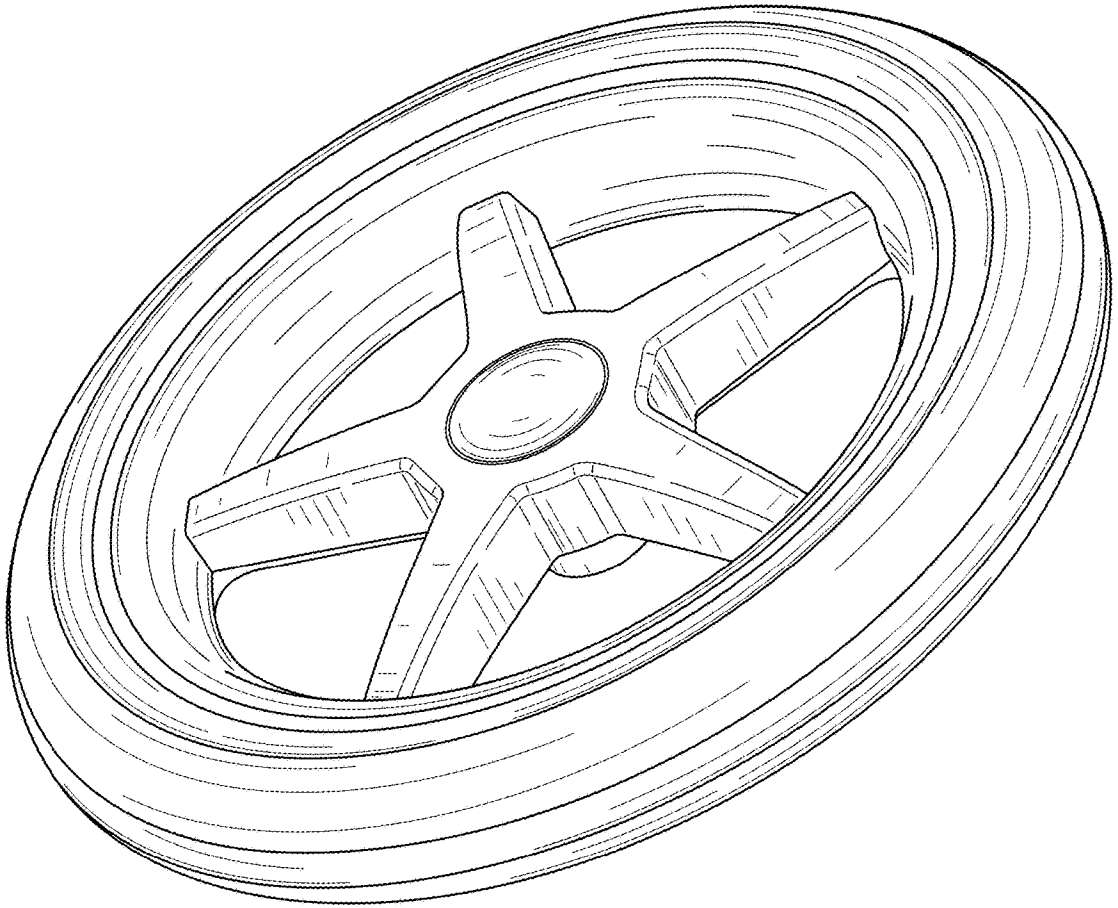
FIG. 1 (Canceled)

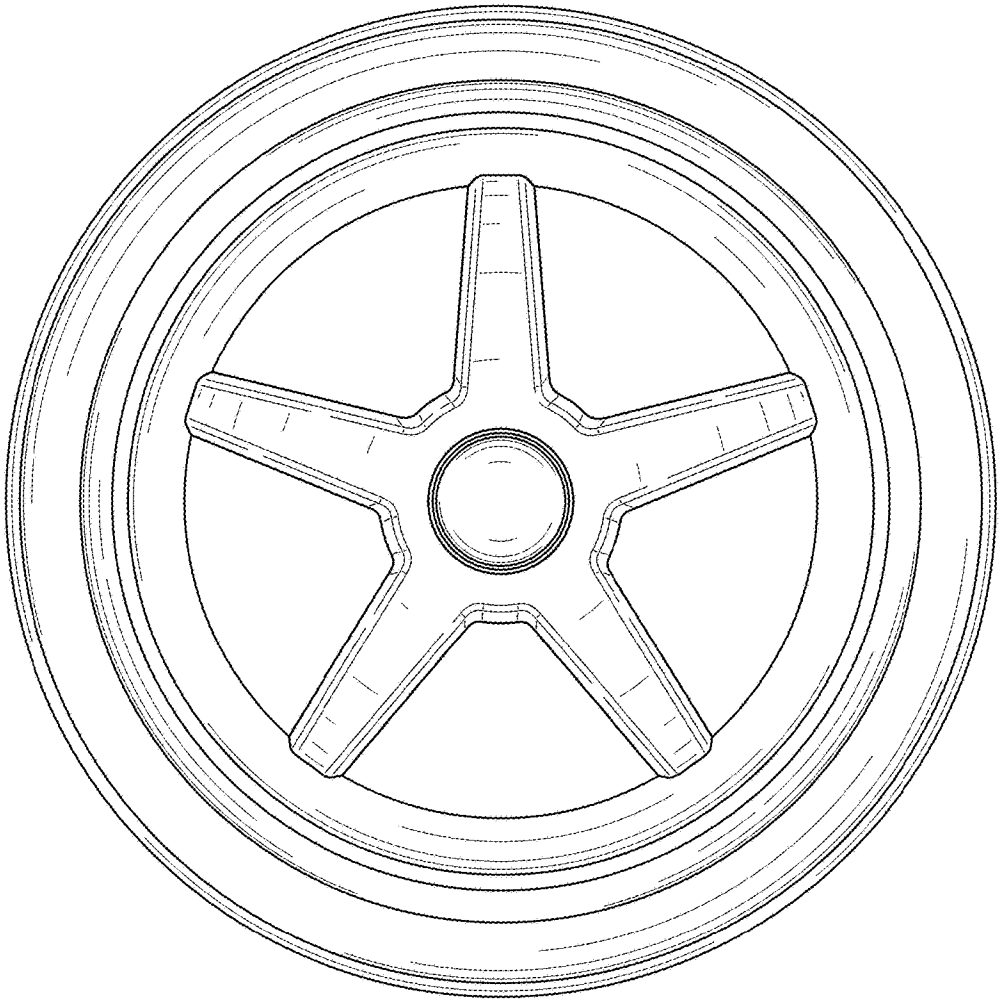
FIG. 2 (Canceled)

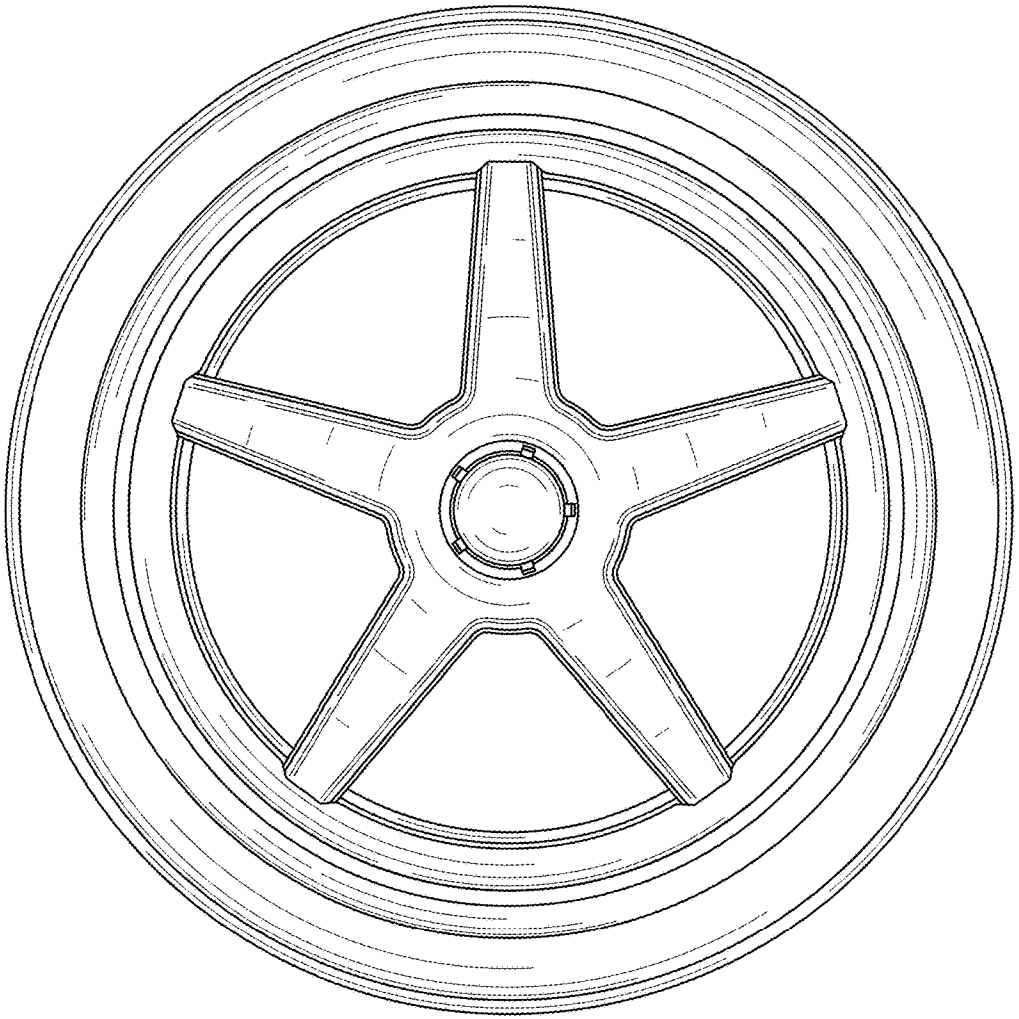
FIG. 3 (Canceled)

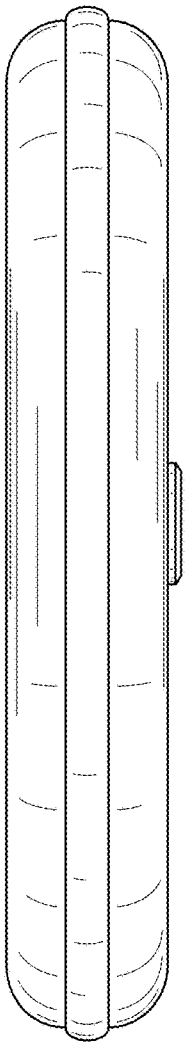
FIG. 4 (Canceled)
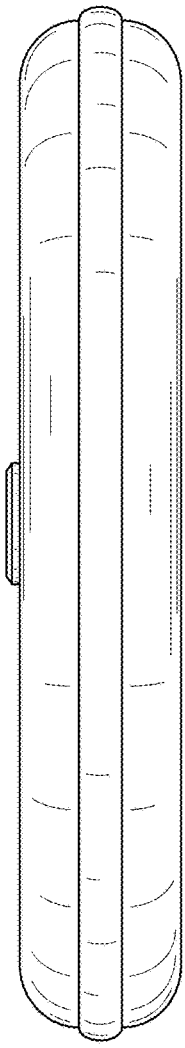
FIG. 5 (Canceled)

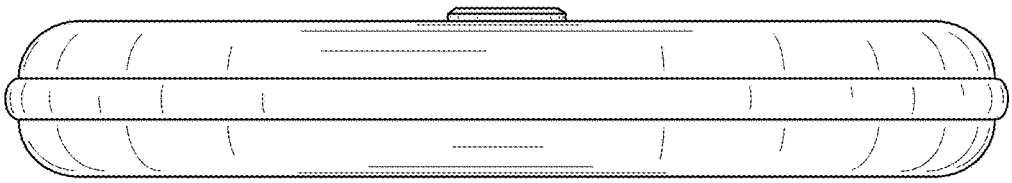
FIG. 6 (Canceled)
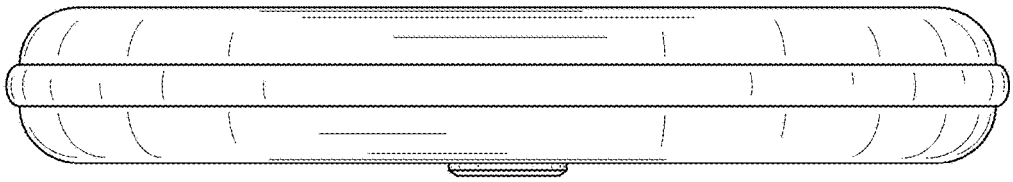
FIG. 7 (Canceled)

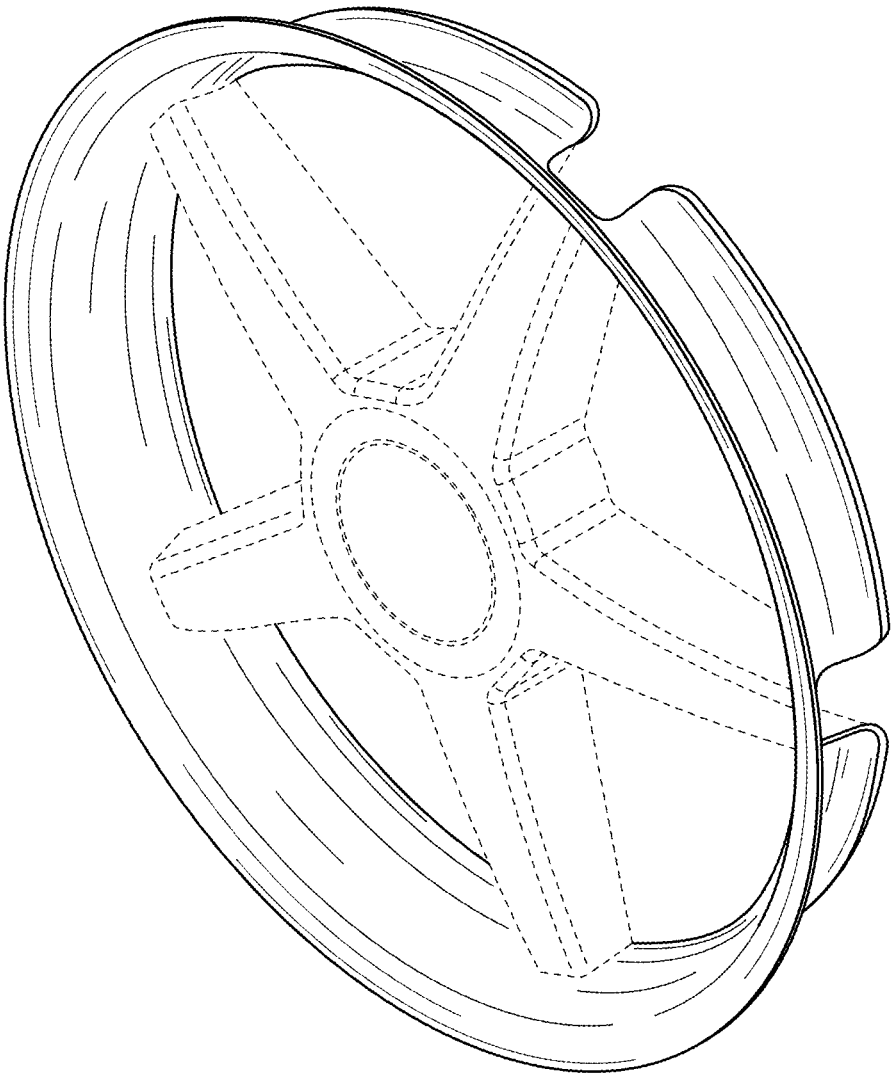
FIG. 8 (Amended)

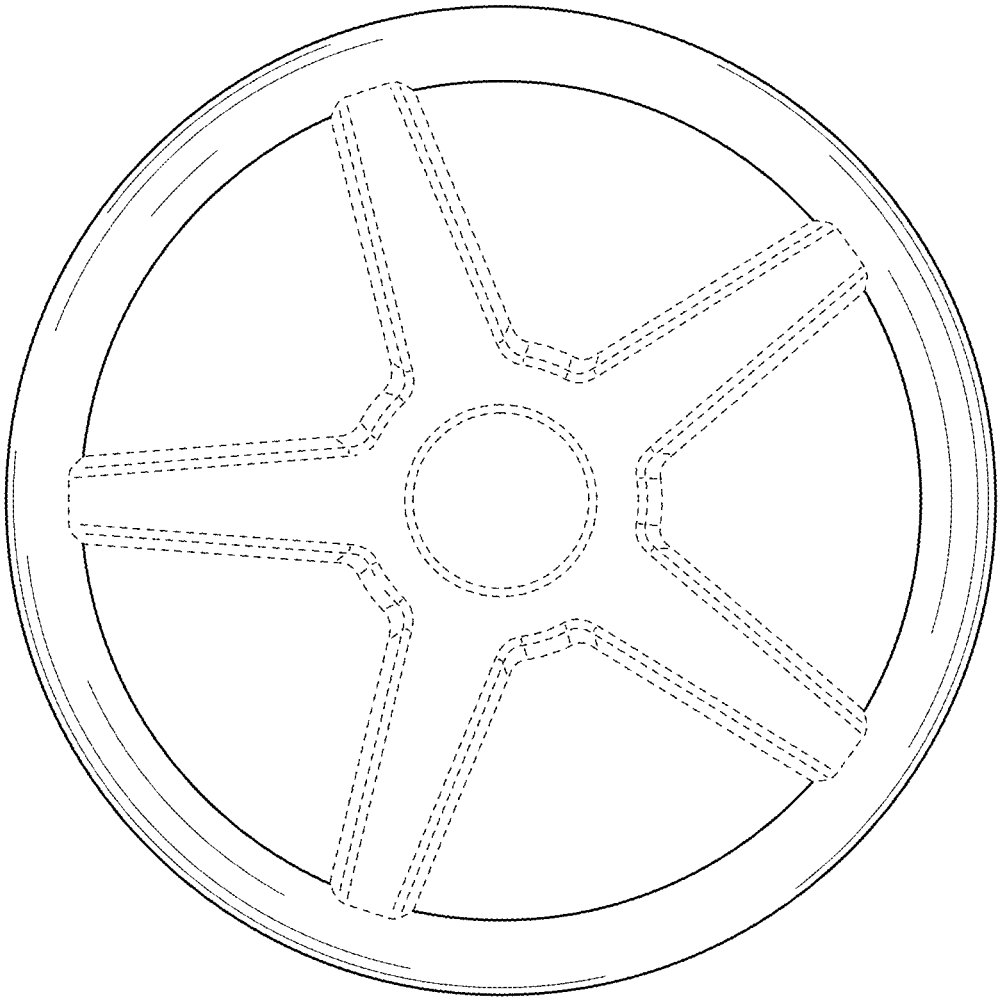
FIG. 9 (Amended)

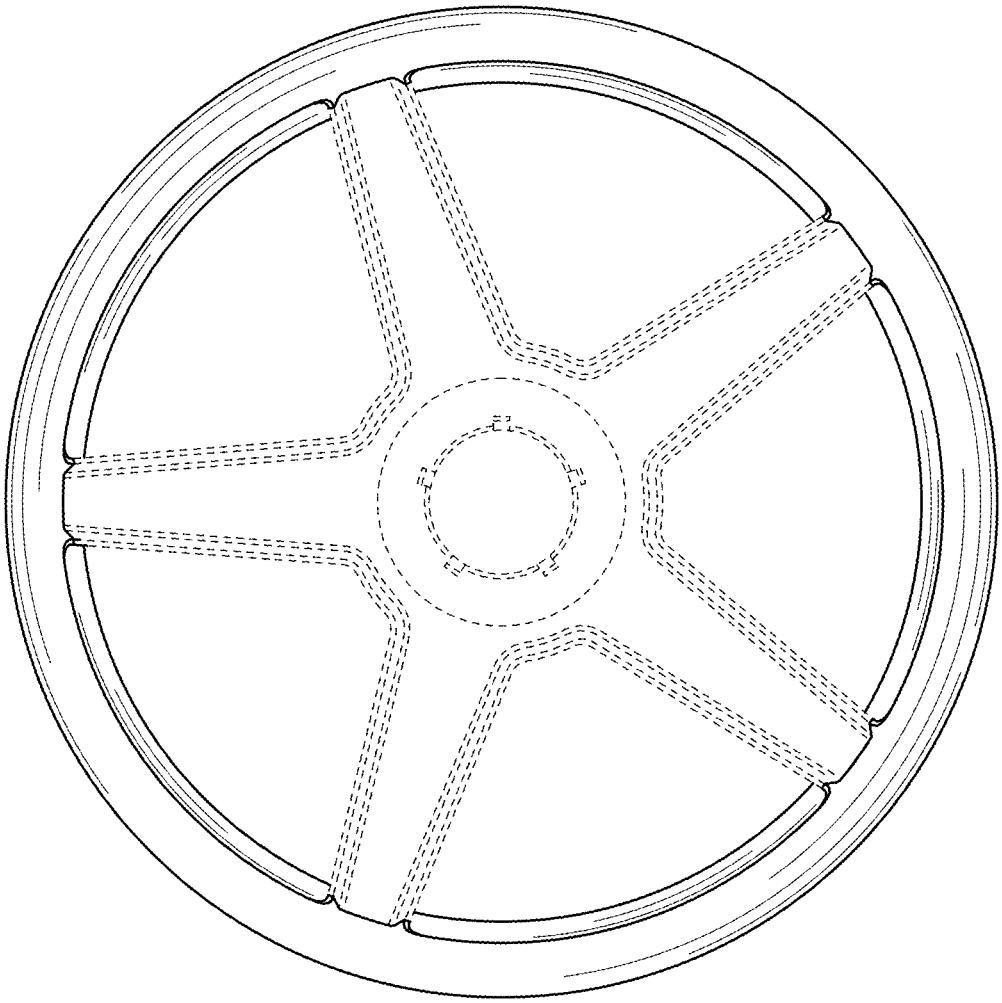
FIG. 10 (Amended)

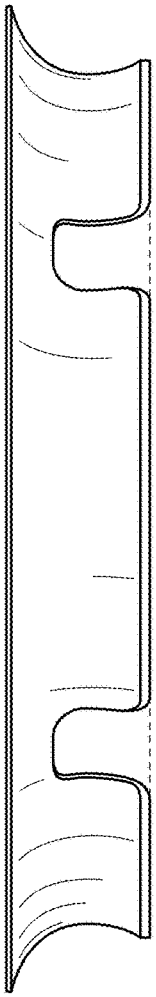
FIG. 11 (Amended)
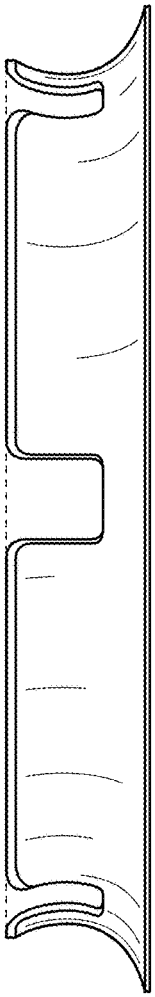
FIG. 12 (Amended)
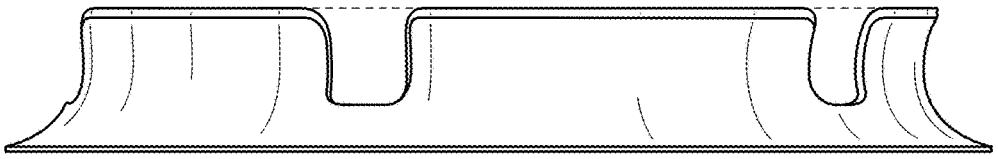
FIG. 13 (Amended)
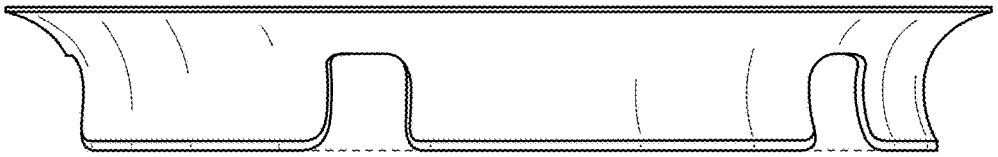
FIG. 14 (Amended)